United States Patent
Shin et al.

(10) Patent No.: US 10,260,438 B2
(45) Date of Patent: Apr. 16, 2019

(54) CYLINDER DE-ACTIVATION CONTROL METHOD AND CYLINDER DE-ACTIVATION SYSTEM

(71) Applicants: Hyundai Motor Company, Seoul (KR); Kia Motors Corporation, Seoul (KR)

(72) Inventors: Gee Wook Shin, Hwaseong-Si (KR); Won Gyu Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/822,431

(22) Filed: Nov. 27, 2017

(65) Prior Publication Data

US 2018/0149100 A1    May 31, 2018

(30) Foreign Application Priority Data

Nov. 25, 2016  (KR) .................. 10-2016-0158699

(51) Int. Cl.
| | |
|---|---|
| *F02D 41/12* | (2006.01) |
| *F02D 41/00* | (2006.01) |
| *F02D 13/06* | (2006.01) |
| *F02P 5/04* | (2006.01) |
| *F02P 5/15* | (2006.01) |

(Continued)

(52) U.S. Cl.
CPC ......... *F02D 41/0087* (2013.01); *F02D 13/06* (2013.01); *F02D 17/02* (2013.01); *F02D 37/02* (2013.01); *F02D 41/0002* (2013.01); *F02D 41/123* (2013.01); *F02P 5/045* (2013.01); *F02P 5/1502* (2013.01); *F02D 13/0223* (2013.01); *F02D 2013/0296* (2013.01); *F02D 2041/0012* (2013.01); *F02D 2200/023* (2013.01); *F02D 2200/0406* (2013.01); *F02D 2200/101* (2013.01); *F02D 2200/501* (2013.01); *F02D 2200/602* (2013.01); *F02D 2250/18* (2013.01); *F02D 2250/21* (2013.01);

(Continued)

(58) Field of Classification Search
CPC .... F02D 41/0087; F02D 41/123; F02D 13/06; F02D 17/02
USPC .............................. 123/481, 198 F; 701/112
See application file for complete search history.

(56) References Cited

U.S. PATENT DOCUMENTS

| | | | | |
|---|---|---|---|---|
| 5,094,206 A | * | 3/1992 | Buslepp | .................... F02D 9/02 |
| | | | | 123/325 |
| 7,757,657 B2 | * | 7/2010 | Albertson | ............... F02D 13/06 |
| | | | | 123/198 F |

(Continued)

FOREIGN PATENT DOCUMENTS

| | | |
|---|---|---|
| JP | 5-195830 A | 8/1993 |
| JP | 6-66166 A | 3/1994 |

*Primary Examiner* — Mahmoud Gimie
(74) *Attorney, Agent, or Firm* — Morgan, Lewis & Bockius LLP

(57) ABSTRACT

A cylinder de-activation control method and a cylinder de-activation system are disclosed. A cylinder de-activation control method of an engine having an odd number of cylinders may include: receiving operation state signals of a vehicle; determining whether the operation state signals correspond to a CDA mode driving region of a CDA apparatus; preparing a CDA driving mode of the CDA apparatus when the operation state signals correspond to the CDA mode driving region; and performing a CDA mode conversion on each cylinder.

8 Claims, 4 Drawing Sheets

(51) Int. Cl.
*F02D 37/02* (2006.01)
*F02D 17/02* (2006.01)
*F02D 13/02* (2006.01)

(52) U.S. Cl.
CPC ........... *F02D 2250/22* (2013.01); *Y02T 10/18* (2013.01); *Y02T 10/42* (2013.01); *Y02T 10/46* (2013.01)

(56) References Cited

U.S. PATENT DOCUMENTS

2016/0237863 A1\* 8/2016 Cecur ..................... F01L 13/00
2017/0114735 A1\* 4/2017 Scheidt ................ F02D 41/006

\* cited by examiner

CYLINDER DE-ACTIVATION CONTROL METHOD AND CYLINDER DE-ACTIVATION SYSTEM

CROSS-REFERENCE TO RELATED APPLICATION

This application claims priority to and the benefit of Korean Patent Application No. 10-2016-0158699 filed in the Korean Intellectual Property Office on Nov. 25, 2016, the entire contents of which are incorporated herein by reference.

BACKGROUND OF THE INVENTION

Field of the Invention

The present invention relates to a Cylinder De-Activation control method and a Cylinder De-activation system. More particularly, the present invention relates to a Cylinder De-Activation control method and a Cylinder De-activation system applied to a three-cylinder engine.

Description of the Related Art

Nowadays, due to sharp rise of a price of oil used as a power source of a vehicle, in engine development, fuel consumption enhancement technology has been largely in the spotlight.

In a low load condition of a predetermined vehicle speed or more or in an idle condition of low demand torque, when generating torque by operating an entire cylinder, surplus power occurs. Accordingly, in order to reduce such surplus power, a Cylinder De-Activation (CDA) apparatus is applied to an engine.

An engine including the CDA apparatus deactivates some or the entire of a cylinder according to an operation state of the engine, thereby improving fuel consumption. In a deactivated cylinder, because fuel injection is not performed, a fuel consumption amount is reduced and power loss due to a friction does not occur. Accordingly, fuel consumption may be considerably improved.

The CDA apparatus generally applied to a four-cylinder engine or an eight-cylinder engine, and the CDA may be realized in a half of the number of entire cylinders (Half mode CDA), thereby noise or vibration characteristic may be controlled stably.

Unlike an engine having an even number of cylinders, in case of three-cylinder engine, it is impossible to implement the CDA in a half of the number of entire cylinders, and thus there is a limit in improving Noise Vibration Hardness (NVH) performance. In other words, even though the CDA apparatus is applied to the three-cylinder engine, there is no choice but to deactivate one cylinder or two cylinders of three cylinders according to an engine state, and as a result power loss reduction efficiency is reduced.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a cylinder de-activation control method and a cylinder de-activation system that can implement Half-mode CDA in a three-cylinder engine.

A cylinder de-activation control method of an engine having an odd number of cylinders according to an exemplary embodiment of the present invention may include: receiving operation state signals of a vehicle; determining whether the operation state signals correspond to a CDA mode driving region of a CDA apparatus; preparing a CDA driving mode of the CDA apparatus when the operation state signals correspond to the CDA mode driving region; and performing a CDA mode conversion on each cylinder. The performing of the CDA mode conversion may include: selecting a cylinder to be primarily converted in to a CDA mode; deactivating the selected cylinder; and releasing deactivation of the selected cylinder after the selected cylinder is deactivated. In the deactivating the selected cylinder, remaining cylinders except for the selected cylinder may be ignited, in the releasing deactivation of the selected cylinder, the remaining cylinders except for the selected cylinder may be deactivated, and while the selected cylinder is deactivated and ignited, the number of deactivated cylinders is equal to the number of ignited cylinders.

The cylinders may include first, second, and third cylinders. In the performing of the CDA mode conversion, one of the first, second, and third cylinders may be selected to implement the CDA mode and the remaining two cylinders except for the selected cylinder may be ignited at a first cycle, and the selected cylinder may be ignited and the remaining two cylinders except for the selected cylinder may implement the CDA mode at a second cycle.

The selected cylinder may have a predetermined crank angle difference with the remaining cylinders.

The cylinder de-activation control method may further include again determining whether the operation state signals correspond to the CDA mode driving region after releasing the CDA mode. The performing of the CDA mode conversion may be performed again when the operation state signals correspond to the CDA mode driving region.

The operation state signals may include a speed of an engine, a speed of a vehicle, a temperature of an oil, a pressure inside an intake manifold, and a position of an accelerator pedal, and the operation state signals may be substituted to a predetermined map to determine whether the operation state signals correspond to the CDA mode driving region.

The preparing of the CDA driving mode may include: limiting purge that discharges gas in the cylinders; and fixing a phase angle of a continuous variable valve timing apparatus and a target torque.

The preparing of the CDA driving mode may include: retarding an ignition timing; and increasing an air amount based on the number of cylinders to be deactivated.

The preparing of the CDA driving mode may include: retarding an ignition timing; and increasing an air amount based on the number of cylinders to be deactivated.

The cylinder de-activation control method may further include: determining whether the target torque can be maintained in the CDA mode. The retarding of the ignition timing and the increasing of the air amount may be performed again when the target torque cannot be maintained in the CDA mode, and the performing of the CDA mode conversion may be performed when the target torque can be maintained in the CDA mode.

According to an exemplary embodiment of the present invention, the number of deactivated cylinders is substantially 1.5 in the three-cylinder engine, thereby improving NVH characteristic, power loss, and fuel consumption of the three-cylinder engine.

DETAILED DESCRIPTION OF THE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention Throughout the specification, unless explicitly described to the contrary, the word "comprise" and variations such as "comprises" or "comprising" will be understood to imply the inclusion of stated elements but not the exclusion of any other elements.

An exemplary embodiment of the present invention will hereinafter be described in detail with reference to the accompanying drawings.

Figure 1:
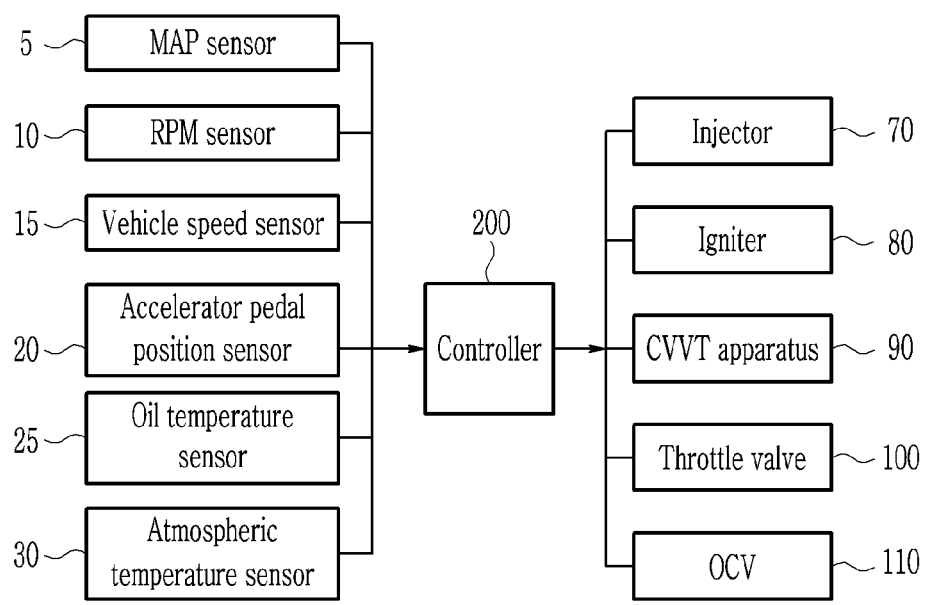
FIG. 1 is a block diagram illustrating a CDA system according to an exemplary embodiment of the present invention.
Figure 2:
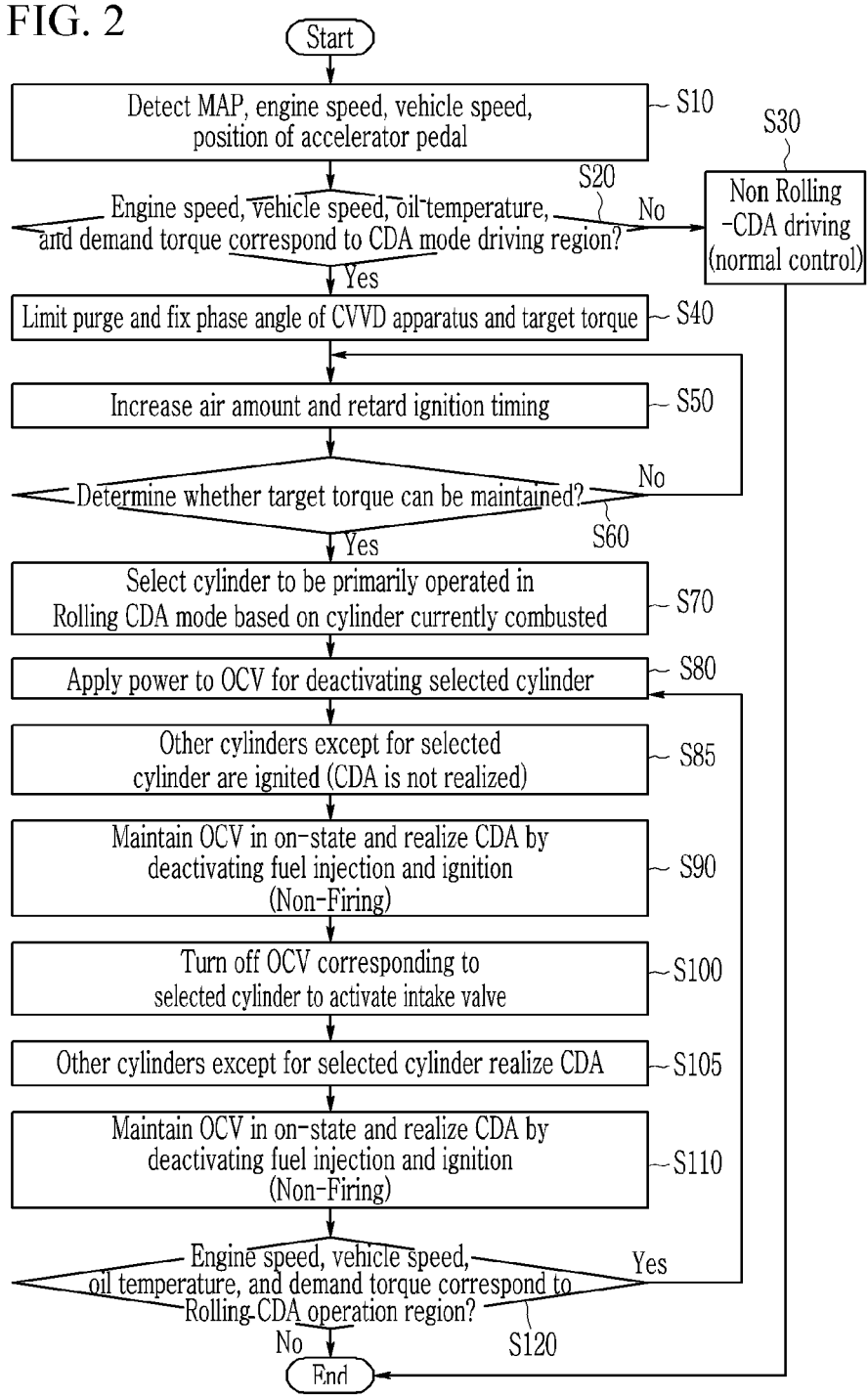
FIG. 2 is a flowchart illustrating a CDA control method according to an exemplary embodiment of the present invention.

FIG. 1 is a block diagram illustrating a CDA system according to an exemplary embodiment of the present invention, and FIG. 2 is a flowchart illustrating a CDA control method according to an exemplary embodiment of the present invention.

Referring to FIG. 1, a CDA (cylinder de-activation) system according to an exemplary embodiment of the present invention includes a Manifold Absolute Pressure (MAP) sensor 5 measuring a pressure inside an intake manifold and outputting a corresponding signal, an engine speed sensor (RPM sensor) 10 measuring a speed of an engine and outputting a corresponding signal, a vehicle speed sensor 15 measuring a speed of a vehicle and outputting a corresponding signal, an accelerator position sensor 20 measuring a position of an accelerator pedal and outputting a corresponding signal, and an oil temperature sensor 25 measuring a temperature of an oil of the engine and outputting a corresponding signal.

A demand torque may be determined based on the signals of the vehicle speed sensor 15 and the accelerator pedal position sensor 20, and an air amount flowing into the engine may be determined based on the signal of the MAP sensor 5.

The CDA system may further include an atmosphere temperature sensor 30 measuring an atmosphere temperature and outputting a corresponding signal.

A controller 200 receives signals of the respective sensors to determine operation states of the vehicle, and controls operations of a fuel injector 70 injecting fuel, an igniter 80 igniting the fuel in a cylinder, a continuous variable valve timing (CVVT) apparatus 90 controlling timing of a valve lift, a throttle valve 100 controlling air amount flowing into the engine, and an oil control valve (OCV) 110 controlling operation of a CDA apparatus deactivating a cylinder based on the operation states of the vehicle.

Referring to FIG. 2, the controller 200 receives operation state signals of the vehicle at step S10, and determines whether the operation state signals correspond to a CDA mode driving region at step S20.

The operation state signals of the vehicle include the speed of the engine, the speed of the vehicle, and the temperature of the oil. The controller 200 substitutes the operation state signals of the vehicle for a predetermined map to determine whether the operation state signals correspond to the CDA mode driving region. When it is determined that the speed of the engine, the speed of the vehicle, and the temperature of the oil do not correspond to the CDA mode driving region at step S20, the controller 200 controls operation of the vehicle according to a normal region operation map at step S30. In other words, the controller 200 does not apply power to the OCV 110, and controls the engine in a normal condition (Non Rolling-CDA mode).

The operation state signals of the vehicle further includes the demand torque, and the controller 200 may substitute the demand torque to the predetermined map to determine whether the operation state signals correspond to the CVD mode driving region. The controller 200 may calculate the demand torque based on the position of the accelerator pedal and the speed of the vehicle.

When the operation state signals of the vehicle correspond to the CDA mode driving region, the controller 200 prepares a CDA driving mode at steps S40 and S50. In this case, the controller 200 may limit purge that discharges gas in the cylinders, and may fix a phase angle of the CVVT apparatus 90 and a target torque at step S40. The target torque may be preset or may be determined based on the demand torque.

In addition, the controller 200 may retard an ignition timing at step S50. In this case, the controller 200 may increase the air amount in consideration of the number of cylinders to be deactivated among entire cylinders. The controller 200 controls operations of the CVVT apparatus 90, the throttle valve 100, and the igniter 80. The controller 200 may operate the CVVT apparatus 90, increase an air amount by opening the throttle valve 100, and retard the ignition timing.

In this way, the controller 200 previously controls operation of the CVVT apparatus 90, and this is to prevent delay of a CDA conversion procedure because a reaction of the CVVT apparatus 980 is relatively slow. In addition, the controller 200 previously acquires the air amount by controlling operation of the throttle valve 100, and retards the ignition timing by controlling operation of the igniter 80, thereby minimizing a change of the demand torque before converting to the CDA driving mode.

The controller 200 controls operations of the fuel injector 70, the igniter 80, and the CVVT apparatus 90 to fix fuel injection and the ignition timing such that the demand torque is not changed.

After that, the controller 200 determines whether the target torque can be maintained in the CDA mode at step S60. When the target torque cannot be maintained at step S60, the controller again performs step S50.

When the target torque can be maintained at step S60, the controller 200 performs a CDA mode conversion on each cylinder. The controller 200 selects a cylinder to be primarily converted into the CDA mode based on a currently combusted cylinder at step S70, applies power to the OCV 110 to deactivate the selected cylinder at step S80, and blocks fuel injection and ignition of the selected cylinder to implement the CDA while the application of the power of the OCV valve 110 is maintained 110 at step S90.

In other words, the controller 200 applies the power to the OCV 110 such that an intake valve becomes a zero lift, and blocks air from being introduced to the cylinder such that the fuel injection and the ignition does not occur.

While the selected cylinder is deactivated at steps S80 and S90, remaining cylinders except for the selected cylinder do not implement CDA and are ignited at step S85. The selected cylinder has a predetermined crank angle difference with the remaining cylinders.

After the selected cylinder implements the CDA at step S90, the controller 200 releases the application of the power to the OCV 110 such that the intake valve of the selected cylinder is operated and fresh air is introduced to the selected cylinder at step S100, and releases the CDA through fuel injection and ignition.

When the application of the power to the OCV valve 110 that correspond to the selected cylinder is released and maintained, remaining cylinders except for the selected cylinder implement the CDA at step S105.

When the CDA of the selected cylinder is released at step 105, the controller 200 determines again whether the operation state signals of the vehicle correspond to the CDA mode driving region at step S110. When the operation state signals correspond to the CDA mode driving region, the controller 200 performs again steps S80 to S105, and finishes the method when the operation state signals does not correspond to the CDA mode driving region.

When steps S80 to S105 are repeatedly performed, the process of implementing and releasing the CDA in each cylinder is repeated. During this process, when a corresponding cylinder is deactivated by implementing the CDA, the corresponding cylinder should be in a state in which the remaining exhaust gas after the combusting is exhausted and fresh air is not introduced. Accordingly, when the CDA is implemented, the power is applied to the OCV 110 to release the intake valve of the corresponding cylinder (i.e., the intake valve becomes zero lift) such that fresh air is not introduced. When the CDA is released, the application of the power is released to operate the intake valve of the corresponding cylinder such that fresh air is introduced.

In this way, when the selected cylinder implements the CDA, the remaining cylinders except for the selected cylinder are ignited, and when the OCV of the selected cylinder is released at a next cycle, the remaining cylinders except for the selected cylinder implements the CDA.

In the case of three-cylinder engine, when a selected one of three cylinders implements the CDA, two other cylinders are not ignited, and when the two other cylinders implement the CDA at a next cycle, the selected cylinder is ignited. Accordingly, while the selected cylinder is deactivated and ignited, the number of deactivated cylinders is 3 and is equal to the number of ignited cylinders.

The present invention is not limited to the three-cylinder engine and is applicable to an engine having an odd number of cylinders.

For example, two cylinders of five-cylinder engine may be selected to implement the CDA, and three other cylinders may release the CDA. At a next cycle, the selected two cylinders may release the CDA, and the three other cylinders may implement the CDA. While the selected two cylinders implement and release the CDA, the number of cylinders implementing the CDA is 5 and the number of cylinders releasing the CDA is 5 such that the Half-mode CDA is implemented in the five-cylinder engine.

Hereinafter, an example of the CDA control method will be described I detail.

Figure 3:
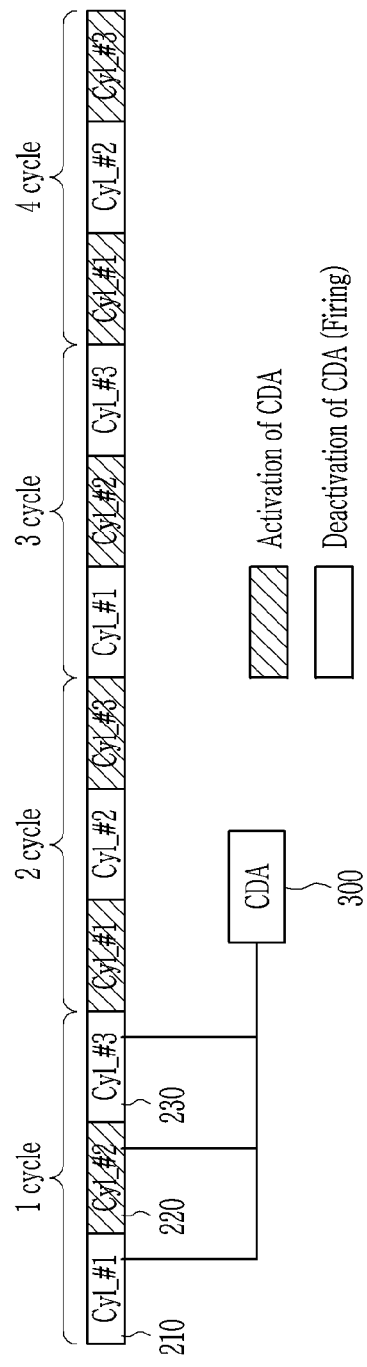
FIG. 3 is a graph illustrating an ignition sequence of a three-cylinder engine in which a CDA control method is applied according to an exemplary embodiment of the present invention.

FIG. 3 is a graph illustrating an ignition sequence of a three-cylinder engine in which a CDA control method is applied according to an exemplary embodiment of the present invention.

Referring to FIG. 3, a system in which the method is applied is a three-cylinder engine having a first cylinder 210, a second cylinder 220, and a third cylinder 230. The system further includes a CDA apparatus 300 selectively deactivating some of three cylinders.

While the CDA apparatus 300 is operated, fuel is not supplied to a cylinder to be deactivated, and the intake valve and the exhaust valve are not operated. The CDA apparatus 300 may be one apparatus connected to the first, second, and third cylinders 210, 220, and 230 or may be three apparatuses provided to the first, second, and third cylinders 210, 220, and 230, respectively.

The CDA apparatus 300 is known to a person of ordinary skill in the art and a detailed description thereof will be omitted.

As shown in FIG. 3, when the selected cylinder at a first cycle is the second cylinder 220, the CDA apparatus is operated to block fuel injection and ignition of the second cylinder 220 such that the second cylinder 220 is deactivated. In this case, the first and third cylinders 210 and 230 are ignited.

At a second cycle, the CDA apparatus 300 is operated to deactivate the first and third cylinders 210 and 230, and the second cylinder 220 is ignited. The first cylinder 210 subsequent to the second cylinder 220 may be ignited while having a predetermined crank angle difference and the second cylinder 230 subsequent to the first cylinder 210 may be ignited while having a predetermined crank angle difference.

A crank angle difference between the first cylinder 210 and the third cylinder 230 is limited to an angle in which the second cylinder 220 can be maintained in the deactivated state. Accordingly, when the second cylinder 220 is deactivated at the first cycle, the first and third cylinders 210 and 230 may be ignited, and when the second cylinder 220 is ignited at the second cycle, the first and third cylinders 210 and 230 may be deactivated.

The second cylinder 220 is exemplified as the selected cylinder, but the first cylinder 210 or the third cylinder 230 may be the selected cylinder.

When the first cycle and the second cycle are regarded as one period, three combustion chambers among six combustion chambers are selectively deactivated. In other words, according to an exemplary embodiment of the present invention, the number of deactivated cylinders is substantially 1.5 in the three-cylinder engine (Half mode CDA).

At third and fourth cycles, the first, second, and third cylinders 210, 220, and 230 are operated in a like manner of the first and second cycles, thereby improving NVH characteristic and power loss of the three-cylinder engine.

Figure 4:
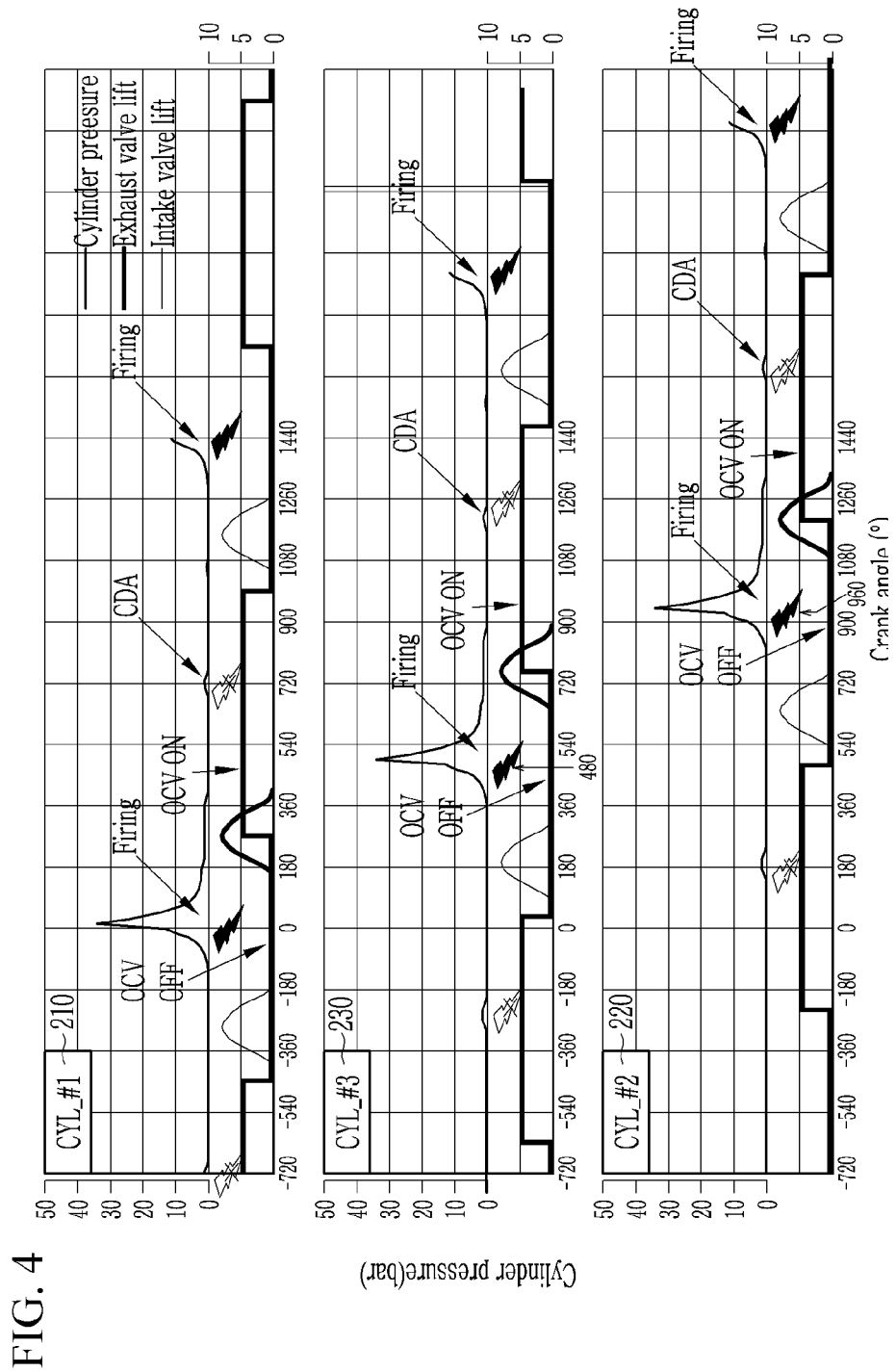
FIG. 4 is an operation graph of three cylinders provided in a CDA system in which a CDA control method is applied according to an exemplary embodiment of the present invention.

FIG. 4 is an operation graph of three cylinders provided in a CDA system in which a CDA control method is applied according to an exemplary embodiment of the present invention. Implementation state of CDA according to crank angles of the first, second, and third cylinders 210, 220, and 230 are sequentially illustrated in FIG. 4.

When the controller 200 determines that a state of the vehicle correspond to the CDA mode driving region, the controller 200 selects a cylinder to be primarily converted into the CDA mode based on a currently combusted cylinder.

When the selected cylinder is the first cylinder 210, power is applied to the OCV 110 in an off state so as to deactivate the first cylinder 210 and fuel injection and ignition of the first cylinder 210 are blocked, thereby implementing the CDA. Referring to FIG. 4, the CDA may be implemented while the power is applied to the OCV 110 in a crank angle of 270° to 990°.

While the CDA is implemented in the first cylinder 210, the second cylinder 220 and the third cylinder 230 are sequentially ignited. The second cylinder 220 is ignited when the crank angle is 480°, and the third cylinder 230 is ignited when the crank angle is 960°.

The second and third cylinders 220 and 230 may be ignited while the first cylinder 210 is deactivated (the first cycle).

The second cylinder 220 is in the deactivated state next to the first cylinder 210 when the crank angle is between 750° and 1470°, and the third cylinder 230 is in the deactivated state when the crank angle is between 1200° and 1920°. When the third and second cylinders 230 and 220 are in the deactivated state, the first cylinder 210 is ignited when the crank angle is 1440° (the second cycle).

In this way, one cylinder among the three cylinders implements the CDA at the first cycle and two cylinders among the three cylinders implement the CDA at the second cycle, and thus the number of deactivated cylinders is substantially 1.5 in the three-cylinder engine (Half mode CDA). The values of the crank angle are merely an example, and the present invention is not limited thereto.

The control method may be applied to an engine having an odd number of cylinders, thereby improving NVH (noise, vibration, and harshness) characteristic and fuel consumption.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cylinder de-activation (CDA) control method of an engine having an odd number of cylinders, the method comprising:
   receiving operation state signals of a vehicle;
   determining whether the operation state signals correspond to a CDA mode driving region of a CDA apparatus;
   preparing a CDA driving mode of the CDA apparatus when the operation state signals correspond to the CDA mode driving region; and
   performing a CDA mode conversion on each cylinder,
   wherein the performing of the CDA mode conversion comprises:
      selecting a cylinder to be primarily converted in to a CDA mode;
      deactivating the selected cylinder; and
      releasing deactivation of the selected cylinder after the selected cylinder is deactivated;
   wherein in the deactivating the selected cylinder, remaining cylinders except for the selected cylinder are ignited,
   wherein in the releasing deactivation of the selected cylinder, the remaining cylinders except for the selected cylinder are deactivated, and
   wherein while the selected cylinder is deactivated and ignited, the number of deactivated cylinders is equal to the number of ignited cylinders,
   wherein the cylinders include first, second, and third cylinders,
   wherein in the performing of the CDA mode conversion, one of the first, second, and third cylinders is selected to implement the CDA mode and the remaining two cylinders except for the selected cylinder are ignited at a first cycle,
   wherein the selected cylinder is ignited and the remaining two cylinders except for the selected cylinder implement the CDA mode at a second cycle, and
   wherein the preparing of the CDA driving mode comprises:
      retarding an ignition timing; and
      increasing an air amount based on the number of cylinders to be deactivated.

2. The cylinder de-activation control method of claim 1, wherein the deactivating of the selected cylinder comprises:
   applying power to an oil control valve (OCV) such that an intake valve of the selected cylinder becomes a zero lift and blocks air from being introduced to the selected cylinder, and
   the releasing of deactivation of the selected cylinder comprises:
   releasing the application of the power to the OCV such that the intake valve is operated and fresh air is introduced to the selected cylinder; and
   releasing deactivation of the selected cylinder through fuel injection and ignition.

3. The cylinder de-activation control method of claim 1, wherein the selected cylinder has a predetermined crank angle difference with the remaining cylinders.

4. The cylinder de-activation control method of claim 1, further comprising:
   again determining whether the operation state signals correspond to the CDA mode driving region after releasing the CDA mode,
   wherein the performing of the CDA mode conversion is performed again when the operation state signals correspond to the CDA mode driving region.

5. The cylinder de-activation control method of claim 1, wherein the operation state signals include a speed of an engine, a speed of a vehicle, a temperature of an oil, a pressure inside an intake manifold, and a position of an accelerator pedal, and
   the operation state signals are substituted to a predetermined map to determine whether the operation state signals correspond to the CDA mode driving region.

6. A cylinder de-activation (CDA) control method of an engine having an odd number of cylinders, the method comprising:
   receiving operation state signals of a vehicle;
   determining whether the operation state signals correspond to a CDA mode driving region of a CDA apparatus;
   preparing a CDA driving mode of the CDA apparatus when the operation state signals correspond to the CDA mode driving region; and
   performing a CDA mode conversion on each cylinder,
   wherein the performing of the CDA mode conversion comprises:
      selecting a cylinder to be primarily converted in to a CDA mode;
      deactivating the selected cylinder; and releasing deactivation of the selected cylinder after the selected cylinder is deactivated, wherein in the deactivating the selected cylinder, remaining cylinders except for the selected cylinder are ignited, wherein in the releasing deactivation of the selected cylinder, the remaining cylinders except for the selected cylinder are deactivated, wherein while the selected cylinder is deactivated and ignited, the number of deactivated cylinders is al to the number of ignited cylinder, and wherein the preparing of the CDA driving mode comprises:
limiting purge that discharges gas in the cylinders; and
fixing a phase angle of a continuous variable valve timing apparatus and a target torque.

7. The cylinder de-activation control method of claim 1, further comprising:
determining whether a target torque can be maintained in the CDA mode,
wherein the retarding of the ignition timing and the increasing of the air amount are performed again when the target torque cannot be maintained in the CDA mode, and
wherein the performing of the CDA mode conversion is performed when the target torque can be maintained in the CDA mode.

8. A cylinder de-activation (CDA) system, comprising:
a manifold absolute pressure sensor measuring a pressure inside an intake manifold;
an engine speed sensor measuring a speed of an engine;
a vehicle speed sensor measuring a speed of a vehicle;
an accelerator position sensor measuring a position of an accelerator pedal;
an oil temperature sensor measuring a temperature of an oil of the engine; and
a controller receiving operation state signals of the vehicle from the sensors and controlling operations of a fuel injector, an igniter, a continuous variable valve timing apparatus, a throttle valve, and an oil control valve,
wherein the controller determines whether the operation state signals correspond to a CDA mode driving region,
prepares a CDA driving mode when the operation state signals correspond to the CDA mode driving region,
selects a cylinder among a plurality of cylinders to be primarily converted in to a CDA mode,
deactivates the selected cylinder and ignites remaining cylinders among the plurality of cylinders except for the selected cylinder, and
releases deactivation of the selected cylinder and deactivates the remaining cylinders except for the selected cylinder after the selected cylinder is deactivated,
wherein while the selected cylinder is deactivated and ignited, the number of deactivated cylinders is equal to the number of ignited cylinders, and
wherein the preparing of the CDA driving mode comprises:
limiting purge that discharges gas in the cylinders; and
fixing a phase angle of a continuous variable valve timing apparatus and a target torque.

* * * * *